United States Patent
Vengerov et al.

(10) Patent No.: US 7,539,709 B1
(45) Date of Patent: May 26, 2009

(54) DYNAMIC DATA MIGRATION IN A MULTI-TIER STORAGE SYSTEM

(75) Inventors: David Vengerov, Sunnyvale, CA (US); Harriet G. Coverston, New Brighton, MN (US); Anton B. Rang, Houlton, WI (US); Andrew B. Hastings, Eagan, MN (US)

(73) Assignee: Sun Microsystems, Inc., Santa Clara, CA (US)

( * ) Notice: Subject to any disclaimer, the term of this patent is extended or adjusted under 35 U.S.C. 154(b) by 556 days.

(21) Appl. No.: 11/153,058

(22) Filed: Jun. 15, 2005

(51) Int. Cl.
*G06F 17/30* (2006.01)
(52) U.S. Cl. .................. 707/204; 707/203; 707/205
(58) Field of Classification Search .......... 707/203–205
See application file for complete search history.

(56) References Cited

U.S. PATENT DOCUMENTS 6,269,382 B1 * 7/2001 Cabrera et al. ............. 707/204
7,092,977 B2 * 8/2006 Leung et al. ................ 707/205

OTHER PUBLICATIONS

D. Vengerov, "A Reinforcement Learning Framework for Utility-Based Scheduling in Resource-Constrained Systems"; pp. 16; Feb. 2005.

* cited by examiner

*Primary Examiner*—Yicun Wu
(74) *Attorney, Agent, or Firm*—Osha • Liang LLP

(57) ABSTRACT

A method and apparatus for managing data is described which includes determining the current state of a storage tier of a plurality of storage tiers within a storage system. Further, a prediction is made, using a prediction architecture comprising at least one predetermined variable, of the utilities of future expected states for at least two of a plurality of storage tiers involved with a data operation, wherein a future expected state of a corresponding storage tier is based on conditions expected to occur following the completion of the data operation. Finally, the data operation is performed if the predicted utility of the future expected state associated with the at least two of a plurality of storage tiers is more beneficial than the utility of the current state.

16 Claims, 4 Drawing Sheets

DYNAMIC DATA MIGRATION IN A MULTI-TIER STORAGE SYSTEM

STATEMENT REGARDING FEDERALLY SPONSORED RESEARCH OR DEVELOPMENT

This invention was made with United States Government support under contract NBCH020055 awarded by the Defense Advanced Research Projects Agency. The United States Government has certain rights in the invention.

This application contains subject matter that may be related to the subject matter in the following U.S. application assigned to the assignee of this application: U.S. patent application Ser. No. 11/077,472, entitled "Dynamic Routing of I/O Requests in a Multi-tier Storage Environment" and filed on Mar. 10, 2005.

BACKGROUND

In modern computer systems, it is common to combine several physical storage units, such as disk drives, tape drives, compact disc (CD) drives, etc. within a storage system to store and retrieve information needed by the system from time to time, and to provide enough free storage space to accommodate system operations.

In such computer systems, the latency associated with data operations involving those storage systems often has an effect on the overall efficiency of computer system operations. A high latency often results in delayed execution of processes depending on those data operations, and also slows execution of processes which need to use the results of those operations. Thus, lowering latencies associated with storage system data operations increases overall computer system throughput.

In addition to designing storage systems that employ higher capacity disk drives, designers of such storage systems have moved in recent years to include multi-tiered storage systems, having increased data integrity.

Different types and formats of storage systems exist to maintain the data integrity of files stored therein and which provide for data recovery in the case of failure of a portion or all of a disk storage unit. For example, different versions of redundant arrays of independent disks (RAID) use parity bits and other techniques to ensure that a corrupt file may be re-created using data from multiple portions of the array, or may alternatively be retrieved from a non-corrupt portion of the array having a second copy of the file.

Multitiered storage systems often determine whether to migrate data between storage tiers based on a fixed set of criteria.

SUMMARY

A method for managing data is described which includes determining the current state of a storage tier of a plurality of storage tiers within a storage system. Further, a prediction is made, using a prediction architecture comprising at least one predetermined variable, of the utilities of future expected states for at least two of a plurality of storage tiers involved with a data operation, wherein a future expected state of a corresponding storage tier is based on conditions expected to occur following the completion of the data operation. Finally, the data operation is performed if the predicted utility of the future expected state associated with the at least two of a plurality of storage tiers is more beneficial than the utility of the current state.

A computer system comprising a multi-tier storage system is described, the multi-tier storage system having a prediction algorithm to adaptively tune functions which map variables describing the state of each storage tier of the storage system into the average latency experienced by data operations associated with the storage tier.

Other aspects of the invention will be apparent from the following description and the appended claims.

DETAILED DESCRIPTION

Figure 1:
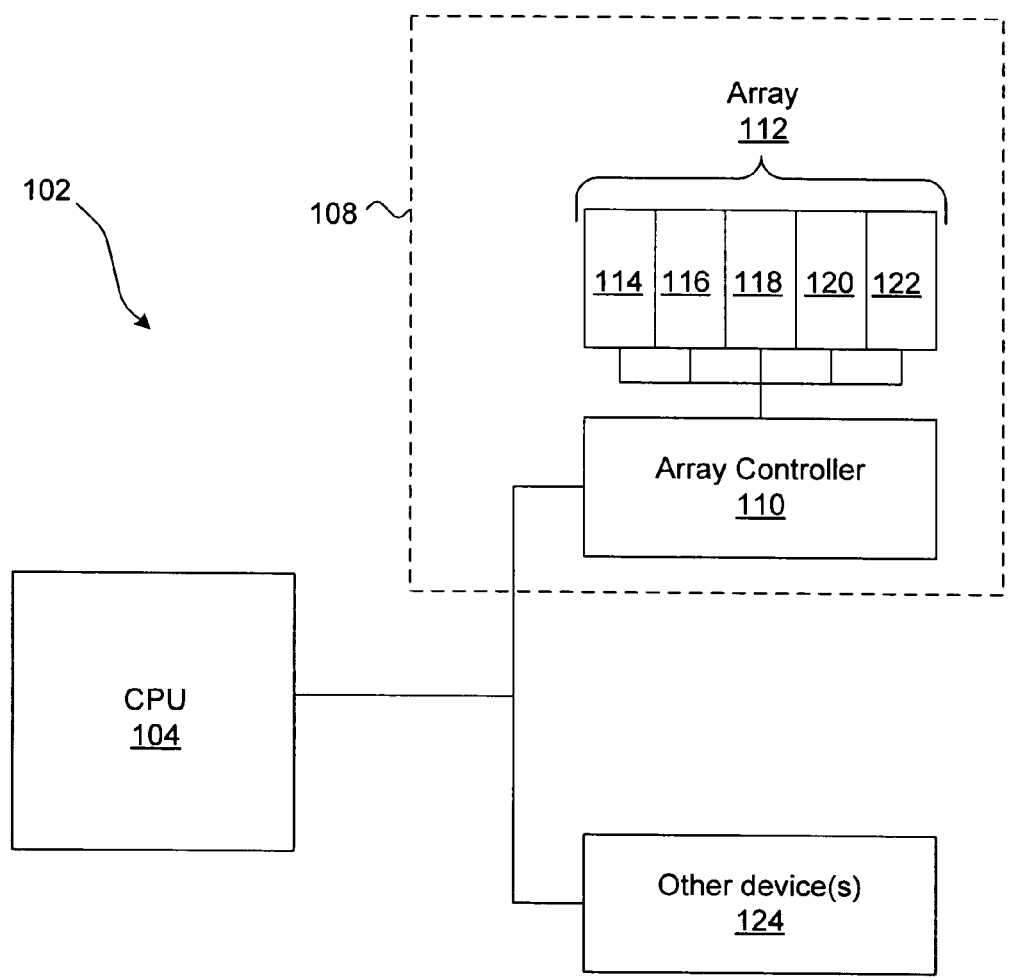
FIG. 1 is a block diagram of a computer system employing a storage system or disk array having multiple storage tiers according to one or more embodiments of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for managing data in a multi-tier storage system to maximize the long-term average utility the storage system expects to obtain in the future. In one or more embodiments of the invention, maximizing utility results in reducing latency.

In one or more embodiments of the invention, a method and apparatus for managing data within a storage system is provided wherein predictions are made of the utility of future states of storage tiers which are expected to occur over time within the storage system.

In one or more embodiments of the present invention, internal data operations are performed when those operations are expected to result in a state having greater long term utility than the utility associated with a state existing prior to the data operations being performed. A data operation is any operation affecting data within storage system 108, such as deleting one or more files or portions of files from one or more storage tiers, moving one or more files or portions of files from one storage tier to another, or duplicating one or more files or portions of files across one or more storage tiers within the storage system, or any combination thereof.

A more generalized approach to the routing problem is characterized as a Markov Decision Process (MDP), which is a formalism for modeling stochastic, sequential decision problems. In this approach, at any given time, a storage tier is considered to be in some state, the state having characteristics that may be described with respect to disk capacity, available space, average time to read a file, average time to write a file, etc. Prediction architecture evaluates the states of various ones of the storage tiers within the storage system and predicts new utilities associated with states expected to exist in the future, resulting from performing one or more data operations and serving one or more service requests.

Once a data operation is performed or a service request is completed within the storage system, a "reward" is received by the system, and a new storage tier state exists. The invention includes, in one or more embodiments of the invention, reinforcement learning algorithms which adaptively tune the prediction architecture based on state transitions occurring over time. In one or more embodiments of the invention, the prediction architecture learns which data operations are best by trying them and adjusting prediction algorithms based on evaluating states resulting from completing those data operations.

FIG. 1 is a block diagram of a computer system employing a storage system or disk array having multiple storage tiers according to one or more embodiments of the invention. In one or more embodiments of the invention, computer system 102 includes a central processing unit (CPU) 104, coupled to a storage system 108. Storage system 108 may include array controller 110 coupled to storage array 112 which includes storage tiers 114, 116, 118, 120, and 122. CPU 104 may also be coupled to other devices 124.

Persons of ordinary skill in the art having the benefit of this disclosure will readily be aware that elements of the aforementioned computer system 102 may be distributed and therefore may be remote from and connected to the other elements over a network. Further, elements and portions of elements of storage system 108 may also be distributed.

Array controller 110 manages the operations of storage array 112 in order to accommodate the needs of computer system 102. Therefore, should computer system 102 need to retrieve data from or write data to storage system 108, a storage request to perform the desired operation is prepared and forwarded to array controller 110. In one or more embodiments of the invention, array controller 110 then determines, based on the states of one or more of the various storage tiers 114, 116, 118, 120, and 122, whether a data operation should be performed within storage system 108, resulting in a later state having greater utility than the state which would have existed had the data operation not been performed.

In one or more embodiments of the present invention, decisions to perform data operations may occur at any time, and are not necessarily tied to incoming requests to read data from, or write data to, the storage system. Further, data operations may or may not be queued in a request queue prior to being performed.

A decision to perform a particular data operation includes consideration of whether the storage system is predicted to have, following the data operation, a later state having a greater utility as compared to the utility existing prior to the data operation being performed. The state of a storage tier takes into account various characteristics that affect the utility, and therefore the latency, of the storage system. Such characteristics include, but are not limited to, the speed of the storage tier, the number of requests pending in the storage tier queue, the total size of the write requests in the storage tier queue, and the effective space of the storage tier.

In one or more embodiments of the invention, array controller 110 is configured to function as a prediction architecture and determines whether a data operation should occur based at least partly on the predicted utility of the future expected state of the storage system 108 as a whole. Thus, rather than computing utilities of the future expected states of individual tiers, utilities of future states of the storage system may be predicted based on particular storage tiers involved with a proposed data operation. The data operation is then performed if it is expected to increase the long-term utility for the storage system.

Data operations may be triggered anytime, such as when an application or process needs to store or retrieve data from the storage system, or when the storage system isn't performing other queued operations and thus has bandwidth free to perform such operations.

Figure 2:
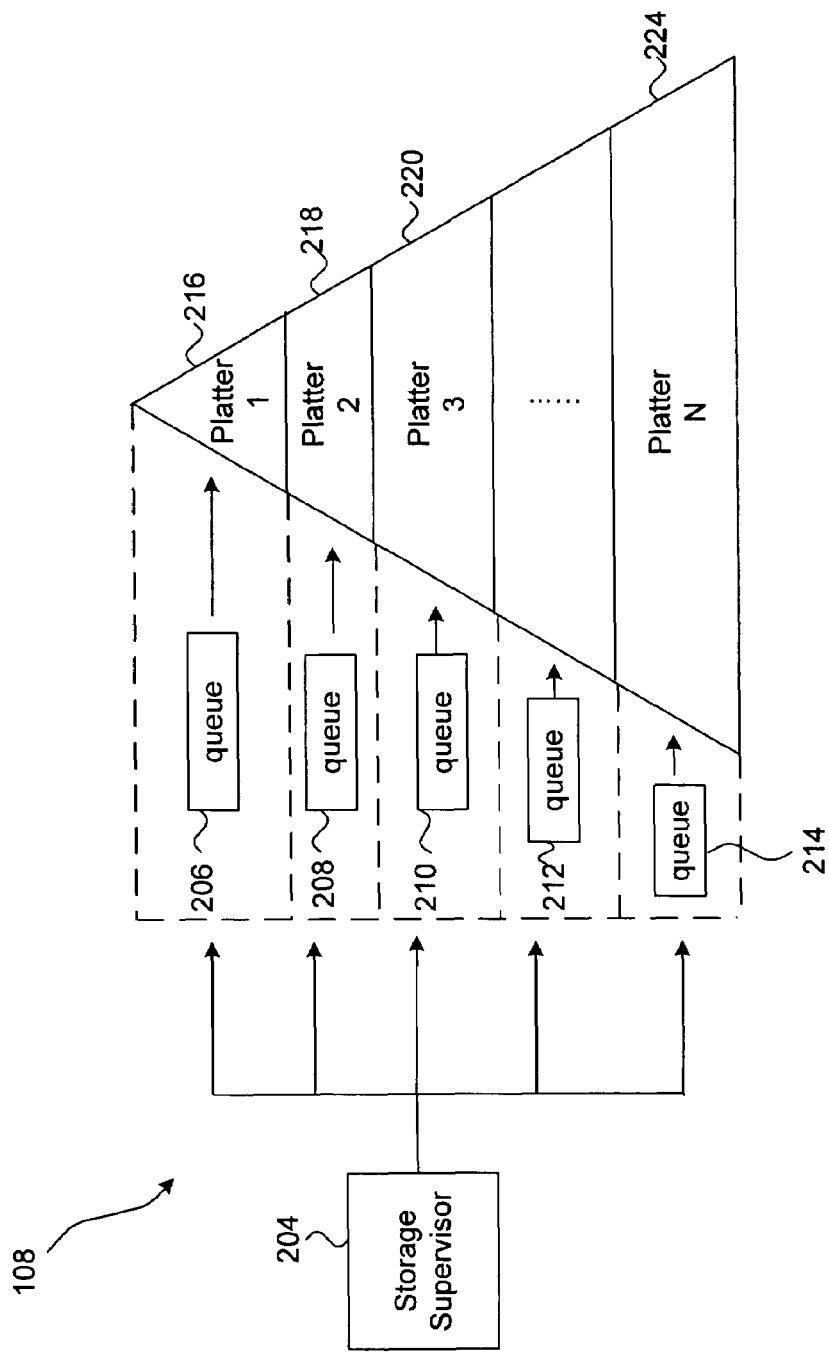
FIG. 2 is a block diagram representation of a tiered storage array according to one or more embodiments of the invention.

FIG. 2 is a block diagram representation of a storage system according to one or more embodiments of the invention. Storage system 108 includes storage supervisor 204 which is configured to manage the distribution of files, portions of files, and other data within storage system 108. In one or more embodiments of the invention, storage supervisor 204 is further configured to route incoming service requests to one or more of request queues 206, 208, 210, 212, and 214 which are configured to temporarily store pending service requests for respective storage platters 216, 218, 220, and 224. In one or more embodiments of the invention, a "storage tier" includes at least a request queue such as queue 206 and a storage platter (such as storage platter 216). In one or more embodiments of the invention, a storage tier is not required to have its own request queue, but may share such a request queue with another storage tier.

Persons of ordinary skill in the art having the benefit of this disclosure will readily appreciate that a request queue may be disposed within any form of storage space capable of holding pending requests such as a RAM memory, a flash memory, an EEPROM, etc. It will be further appreciated by those skilled persons that a request queue may be presented as a linked list, a tree, a stack, or any other type of data structure deemed appropriate for the architecture of the particular storage system employing the invention.

Persons of ordinary skill in the art having the benefit of this disclosure will readily recognize that a storage system employing the invention may include fewer or more tiers than shown here, as needed to accommodate the requirements of the computer system being serviced, such as computer system 102.

Storage platters such as storage platters 216, 218, 220, and 224 may include any type of physical data storage and the associated reading and writing devices used in computing systems, including hard disks, writeable CD-ROM, tape drives, flash drives, etc. Persons of ordinary skill having the benefit of this disclosure will readily know of various types of physical data storage media and how to incorporate and use those media in a computer system according to the invention.

Storage platters such as storage platters 216, 218, 220, and 224 may be distinguished from one another in many ways, including the data capacity, the speed of writing data, the speed of retrieving data, the amount of free space, etc. Further, considering the relative differences between the individual or shared request queues supporting each storage platter such as request queues 206, 208, 210, 212, and 214 is also important. The amount of information in each request queue pertaining to each platter, the size of the write requests present in a request queue, and the amount of time that items have been in the request queue waiting to be operated on by a given tier are all factors to consider when determining which storage tiers, such as storage tiers 114, 116, 118, 120 and 122 (all of FIG. 1) should act on a given service request.

Figure 3:
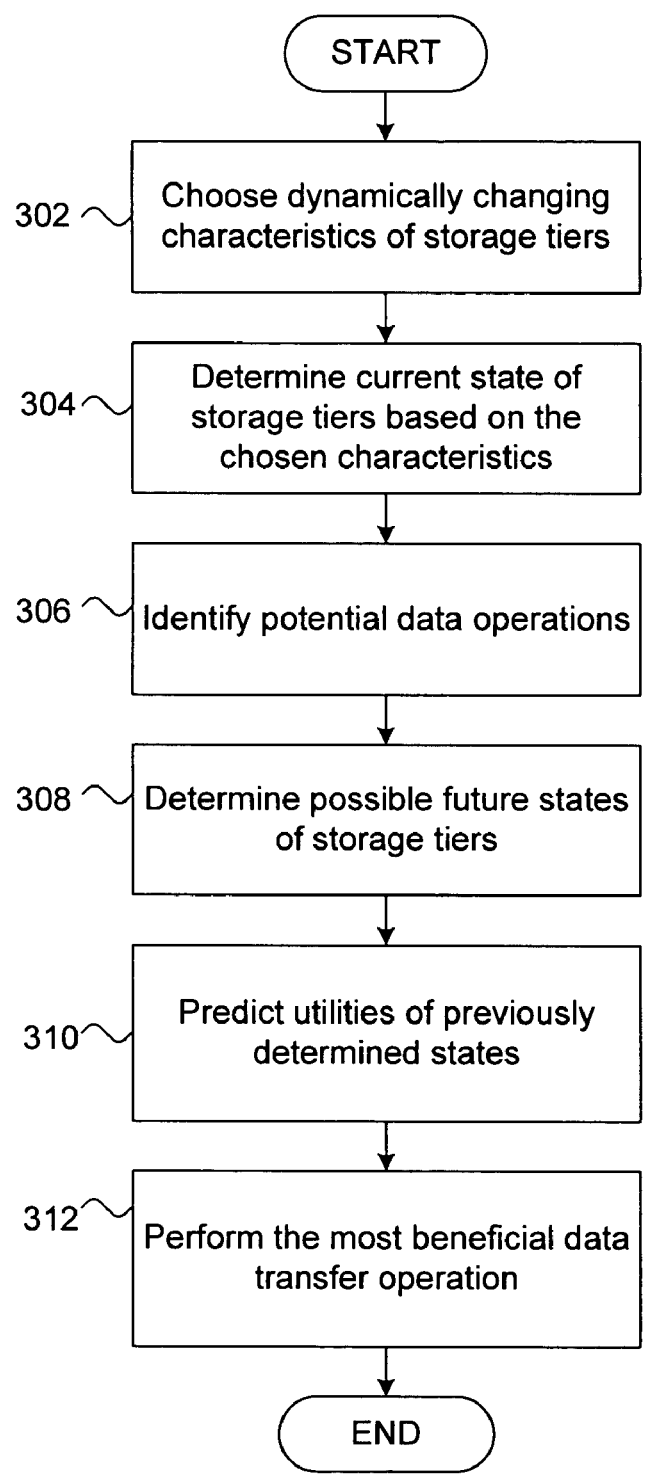
FIG. 3 is a flow chart of a technique for determining whether a data operation is to be performed, according to one or more embodiments of the invention.

FIG. 3 is a flow chart of a technique for determining whether a data operation is to be performed, according to one or more embodiments of the invention. At block 302, characteristics important to determining the state of the various storage tiers are determined. In one or more embodiments of the invention, such characteristics include, but are not limited to, one or more of the data capacities of individual storage platters, the number of requests in each request queue, the total waiting time for all requests in a given queue, the total size of the write requests waiting in each request queue, the effective space available in each storage platter (such as storage platter 220 in FIG. 2), the various latencies associated with writing data into the various storage platters, the latencies associated with retrieving data from the various storage platters, the amount of free space available within each storage platter, the desirability of a file being considered for a data operation, the desirability of other files in a given storage tier, the desirability of other files in other storage tiers, the sizes of files in a given storage tier, and the sizes of files in other storage tiers.

Data operations within a storage system each have an associated "utility" that may be thought of as being inverse to latency. Maximizing average long-term utility may be thought of as reducing the latency associated with future states of the storage system. By performing a data operation to minimize storage system latency, maximum utility is obtained.

The variables that are used to describe the state of each tier should be correlated with the future costs, and therefore the future utility, that the storage system would receive if it were started in that state. Choosing the appropriate state variables is an important component of setting up a reinforcement learning solution to a dynamic optimization problem.

Many characteristics relevant to the determination of individual storage tier states are also relevant to the determination of the state of the overall storage system 108. This is because the computation of the overall state of storage system 108 is largely dependant on a combination of the individual states of storage tiers within the storage system such as storage tiers 114, 116, 118, 120, and 122 (in FIG. 1).

Continuing with FIG. 3, at block 304, the utilities of the states of individual storage tiers within the storage system are determined. Any parameterized utility function approximation may be used in order to determine the utilities of the states. In one embodiment of the invention, a fuzzy rulebase is used which maps a vector defining the state of a tier into a scalar value representing the utility of that state. Persons of ordinary skill in the art having the benefit of this disclosure will readily be aware of how to create and utilize such a fuzzy rulebase. Those skilled persons will further recognize other parameterized value function approximations that may be used, while remaining within the scope and spirit of the invention.

By way of example, if the variables used to determine the utility of a state are represented as x1, x2, x3, etc., then the state of a tier (or system, as the case may be) at a given time is characterized as vector $s=[x1(t),x2(t),x3(t)]$. A fuzzy rulebase maps that state vector into a scalar value y representing the utility of that state. It is the predicted utility of expected future states that are compared with the utility of the current state of various storage tiers (or the storage system as a whole, depending on design), in order to determine whether a data operation is performed. Such a utility represents the long-term average latency that the system expects to obtain in the future, when starting from the state s.

At block 306, the storage supervisor examines information within storage system 108 to determine whether one or more data operations are available to be performed on one or more files or portions of files within the storage system.

At block 308, the future states of the storage tiers likely to be associated with the data operation are determined.

Assume that a data operation is being examined to determine whether performing that data operation on a given file is expected to result in greater long term system utility.

Thus, if storage tiers 114, 118, and 120 are involved with a proposed data operation being examined, the expected future states are determined for each storage tier 114, 118, and 120. The possible data operations may include but are not limited to moving one or more files or portions of files from one storage tier to a different storage tier, deleting one or more files or portions of files from a storage tier, adding one or more files or portions of files to a storage tier (e.g. adding new data that had not been previously present in any storage tier, or alternatively duplicating data in one storage tier that is also present in a different storage tier).

At block 310, the utilities of the future states determined at 308 are predicted.

At block 312, storage supervisor 204 performs one or more data operations within storage system 108, based on that storage tier being expected to have a more beneficial later state, as compared to the state the storage tier would have had the data operation not been performed. In one or more embodiments of the present invention, storage supervisor 204 migrates one or more files or portions of files from one storage tier to another storage tier based on there being a predicted beneficial change in the combined state utility of the two tiers being considered together. Thus, if one of the two tiers being considered has a predicted slight negative change in its state utility and the second tier has a predicted large positive change in its state utility, the relocation of those one or more files or portion of files from one tier to another will be triggered to occur.

In one or more embodiments according to the present invention, determining a predicted beneficial change in the state of a storage tier is accomplished by determining a difference between the predicted value of the utility of the state from block 304 and a predicted value of the future state utility determined at block 308.

The technique just described predicts the state of individual storage tiers within storage system 108, and performs data operations such as adding a file or portion of a file, moving a file or portion of a file, or deleting a file or portion of a file based on the predicted future state of one or more storage tiers within storage system 108. In one or more embodiments of the present invention, the determination of states and associated data storage choices may be made simpler in smaller systems by predicting the utilities of the overall initial and future storage system states as compared to computing and considering utilities of initial and future individual storage tier states.

In one or more embodiments of the present invention, a system-wide requirement exists to have more than one copy of one or more files in the system. The more desirable a file is, the more important it becomes to have at least one copy of that file in a high throughput, low latency, storage tier. A state description of such a storage tier, in one or more embodiments of the present invention, includes the number of such copies, and the desirability of that file. If the desirability of a file is low, the corresponding state of the storage system may reflect a lower "cost", and thus a more beneficial state, if one or more unneeded copies of that file are deleted from the storage system. Correspondingly, if the desirability of a file is high (e.g. that files has been accessed frequently) a higher utility may be obtained by duplicating that file so it is then present within more than one storage tier of the storage system 108.

Figure 4:
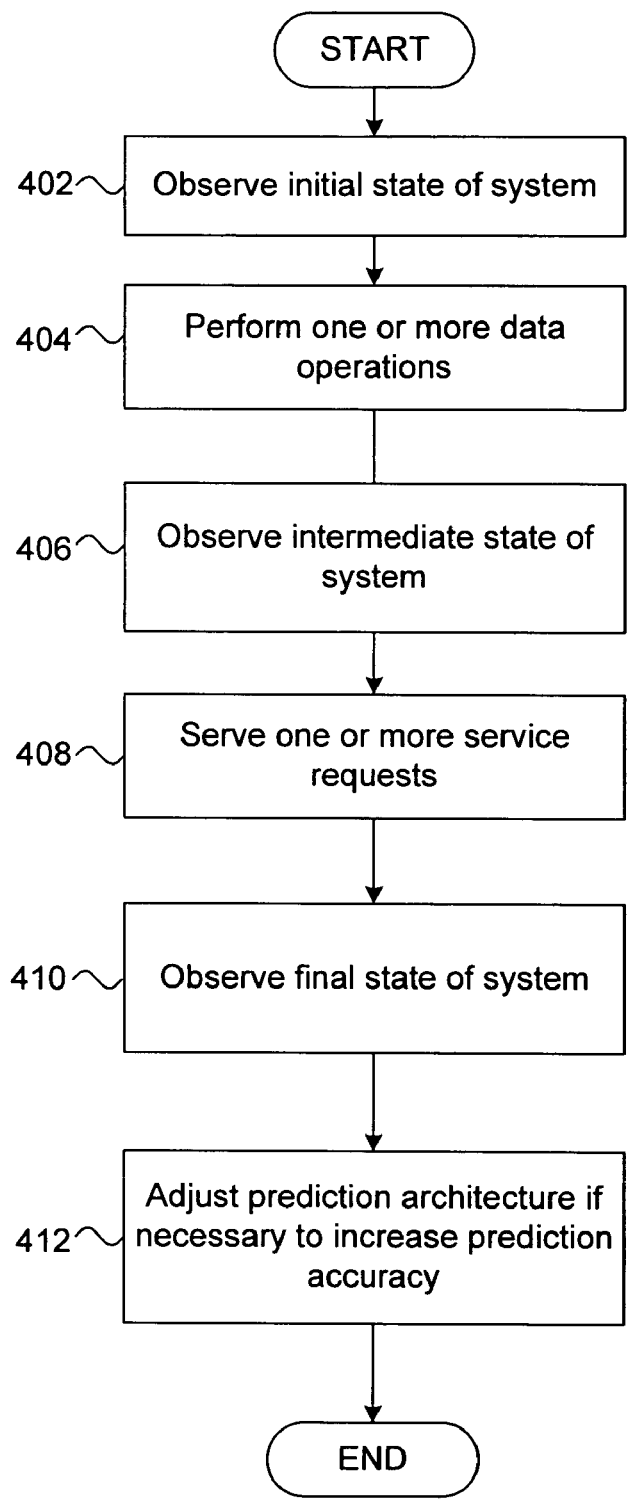
FIG. 4 is a flowchart of a technique for adaptively tuning a prediction architecture according to one or more embodiments of the invention.

FIG. 4 is a flowchart of a technique for adaptively tuning a prediction architecture according to one or more embodiments of the invention. Learning methodology is not generally new, and numerous references discuss Markov decision processes, approximating states of systems, etc. For example, see Ratitch, Bohdana and Precup, Doina, *Characterizing Markov Decision Processes*, McGill University, Montreal, Canada (2002).

Previously, as potential data operations were being examined, storage tiers involved with the data operations were identified, and their initial states determined. Predictions were made as to utilities of expected future states that would occur following the completion of those data operations. The data operations were then performed, or not, depending on whether the later states had greater predicted utility than the earlier states. The following technique builds on that approach, and applies learning methodology to adjust utility prediction models so that more accurate predictions of the utilities of future states may be made.

Adjustments to the utility prediction models may be made at any time. In one or more embodiments of the invention, such adjustments are made at approximately regular time intervals. In one or more embodiments of the invention, adjustments to the utility prediction models are made at intervals loosely corresponding to the number of storage requests served.

Referring to FIG. 4, the system begins in a state s1. The technique begins at block 402 where the prediction architecture observes the state of the system (or of individual storage tiers, depending on system design) and predicts the value of a new state s2 which is expected to result from performing one or more identified data operations and managing one or more service requests to completion.

At block 404, one or more data operations are performed as described in FIG. 3.

At block 406, if the execution time of the data operations performed at block 404 is short as compared to the average time interval between adjustments to the prediction architecture, the prediction architecture optionally observes the system state s3 which is a result of performing the one or more identified data operations.

At block 408, one or more service requests are performed to completion.

At block 410, the prediction architecture observes the system state s4 resulting from performing the one or more identified data operations and performing one or more service requests to completion.

At block 412, the value prediction function $V(s, t)$ (for each tier or for the whole system) is adjusted by an amount change=$f(V(s4, t), V(s1, t-1), l(t), s)$ where $l(t)$ is a function of the latencies of the data operations performed since the last time the value prediction function was updated. In one or more embodiments of the invention, the prediction architecture is adjusted to minimize the difference between the predicted utility of the older state s1 and a function of the value of the new state s4 and the average value of observed latencies of requests served since the state s1 was observed. In one or more embodiments of the invention, the prediction architecture is adjusted to minimize the difference between the predicted utility of the older state s2 and a function of the value of the new state s4 and the average value of observed latencies of requests served since the state s2 was observed.

In one or more embodiments of the invention, instead of treating each request individually, groups of data operations may be evaluated together. In this embodiment, those of ordinary skill in the art having the benefit of this disclosure will readily recognize that data operations to be grouped together should each involve the same one or more storage tiers. Also, to maximize the advantage of grouping data operations together, it is beneficial to ensure that such data operations cause smaller individual changes in state. Data operations expected to cause large state changes should be treated individually.

An application or process that is configured to perform the data operations being discussed may be resident on a single computer within a network of computers, may be an application or process executing on a network of computers, or may be an application or process being executed on a node within a grid, etc. Persons of ordinary skill in the art having the benefit of this disclosure will readily appreciate the various possible types of applications that may require data to be stored to or retrieved from a storage system.

Computer code implementing the methods presented in this disclosure may be stored in memory within a computer, or alternatively stored in more permanent computer readable medium such as hard drives, optical disks, compact disks, and magnetic tape. Further, such code may be transferred over communications networks with or without a carrier wave.

Further, software instructions to perform embodiments of the invention may be stored on a computer readable medium such as a flash memory, compact disc (CD), hard disk drive, diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing data in a storage system comprising:

obtaining a data operation associated with a first storage tier and a second storage tier of the storage system;

obtaining a first plurality of values describing a current state of the first storage tier;

calculating a first existing utility of the first storage tier based on the first plurality of values, wherein calculating the first existing utility comprises evaluating a utility function using the first plurality of values as parameters;

calculating a second existing utility of the second storage tier;

predicting a second plurality of values describing a predicted state of the first storage tier following the data operation;

determining a first future utility of the first storage tier based on the second plurality of values;

determining a second future utility of the second storage tier following the data operation;

calculating a first difference between the first future utility and the first existing utility;

calculating a second difference between the second future utility and the second existing utility;

calculating a third difference between the second difference and the first difference;

executing the data operation based on the third difference;

calculating an actual utility of the first storage tier after executing the data operation;

calculating a fourth difference between the actual utility and the first future utility; and adjusting the utility function based on the fourth difference.

2. The method of claim 1, wherein a value of the first plurality of values represents at least one selected from a group consisting of a data capacity of the first storage tier, a total waiting time for all requests in a queue associated with the first storage tier, a total size of a write request associated with the first storage tier, an average latency associated with writing data into the first storage tier, an average latency associated with retrieving data from the first storage tier, and an amount of free space in the first storage tier.

3. The method of claim 1, wherein a value of the first plurality of values is an access frequency of a file stored in the first storage tier.

4. The method of claim 1, wherein the current state is described by a vector and the first plurality of values are components of the vector.

5. The method of claim 1, wherein the first existing utility is inversely proportional to latency associated with the first storage tier.

6. A computer readable medium storing instruction to manage a storage system, the instructions comprising functionality to:
- obtain a data operation associated with a first storage tier and a second storage tier of the storage system;
- obtain a first plurality of values describing a current state of the first storage tier;
- calculate a first existing utility of the first storage tier based on the first plurality of values, wherein the instructions to calculate the first existing utility comprise functionality to evaluate a utility function using the first plurality of values as parameters;
- calculate a second existing utility of the second storage tier;
- predict a second plurality of values describing a predicted state of the first storage tier following the data operation;
- determine a first future utility of the first storage tier based on the second plurality of values;
- determine a second future utility of the second storage tier following the data operation;
- calculate a first difference between the first future utility and the first existing utility;
- calculate a second difference between the second future utility and the second existing utility;
- calculate a third difference between the second difference and the first difference;
- execute the data operation based on the third difference;
- calculate an actual utility of the first storage tier after executing the data operation;
- calculate a fourth difference between the actual utility and the first future utility; and
- adjust the utility function based on the fourth difference.

7. The computer readable medium of claim 6, wherein a value of the first plurality of values represents at least one selected from a group consisting of a data capacity of the first storage tier, a total waiting time for all requests in a queue associated with the first storage tier, a total size of a write request associated with the first storage tier, an average latency associated with writing data into the first storage tier, an average latency associated with retrieving data from the first storage tier, and an amount of free space in the first storage tier.

8. The computer readable medium of claim 6, wherein a value of the first plurality of values is an access frequency of a file stored in the first storage tier.

9. The computer readable medium of claim 6, wherein the current state is described by a vector and the first plurality of values are components of the vector.

10. The computer readable medium of claim 6, wherein the first existing utility is inversely proportional to latency associated with the first storage tier.

11. An apparatus for managing a storage system comprising:
- means for obtaining a data operation associated with a first storage tier and a second storage tier of the storage system;
- means for obtaining a first plurality of values describing a current state of the first storage tier;
- means for calculating a first existing utility of the first storage tier based on the first plurality of values, wherein calculating the first existing utility comprises evaluating a utility function using the first plurality of values as parameters;
- means for calculating a second existing utility of the second storage tier;
- means for predicting a second plurality of values describing a predicted state of the first storage tier following the data operation;
- means for determining a first future utility of the first storage tier based on the second plurality of values;
- means for determining a second future utility of the second storage tier following the data operation;
- means for calculating a first difference between the first future utility and the first existing utility;
- means for calculating a second difference between the second future utility and the second existing utility;
- means for calculating a third difference between the second difference and the first difference;
- means for executing the data operation based on the third difference;
- means for calculating an actual utility of the first storage tier after executing the data operation;
- means for calculating a fourth difference between the actual utility and the first future utility; and
- means for adjusting the utility function based on the fourth difference.

12. The apparatus of claim 11, further comprising:
- means for calculating an actual utility of the first storage tier after executing the data operation;
- means for calculating a fourth difference between the actual utility and the first future utility; and
- means for adjusting the utility function based on the fourth difference.

13. A storage system comprising:
- a first storage tier comprising a first existing utility based on a first plurality of values used as parameters in the evaluation of a utility function;
- a second storage tier comprising a second existing utility;
- a predictive architecture configured to predict a first future utility of the first storage tier and an actual utility of the first storage tier and a second future utility of the second storage tier after execution of a data operation; and
- a storage supervisor configured to execute the data operation based on a first difference between a first sum of the first existing utility and the second existing utility and a second sum of the first future utility and the second future utility and adjust the utility function based on a difference between the actual utility and the first future utility.

14. The storage system of claim 13, wherein the predictive architecture comprises a fuzzy rule.

15. The storage system of claim 13, wherein the first existing utility is inversely proportional to latency of the first storage tier.

16. The storage system of claim 13, wherein the storage supervisor is further configured to:
- calculate an actual utility of the first storage tier after executing the data operation;
- adjust the utility function based on a second difference between the actual utility and the first future utility.

* * * * *